United States Patent [19]
Yajima et al.

[11] Patent Number: 5,915,677
[45] Date of Patent: Jun. 29, 1999

[54] CIRCULAR PLATE SPRING

[75] Inventors: Kazuo Yajima, Tokyo; Tadashi Nagai; Hidetaka Higashimura, both of Kanagawa; Eizo Suyama, Tokyo; Ryo Mashimo, Yokohama, all of Japan

[73] Assignee: Calsonic Corporation, Tokyo, Japan

[21] Appl. No.: 08/865,353

[22] Filed: May 29, 1997

[30] Foreign Application Priority Data

| Sep. 9, 1996 | [JP] | Japan | 8-237820 |
| Sep. 25, 1996 | [JP] | Japan | 8-252707 |
| Mar. 27, 1997 | [JP] | Japan | 9-074788 |

[51] Int. Cl.$^6$ .................. F16F 1/34; F16F 1/20
[52] U.S. Cl. ........................... 267/161; 267/162
[58] Field of Search ................ 267/158–164; 411/544

[56] References Cited

U.S. PATENT DOCUMENTS

| 1,826,415 | 10/1931 | Bragg et al. | 267/161 |
| 2,565,108 | 8/1951 | Zahodiakin | 267/162 |
| 2,634,123 | 4/1953 | Ralston | 267/162 |
| 3,015,482 | 1/1962 | Maker . | |
| 3,344,397 | 9/1967 | Elliot et al. | 267/161 |
| 3,369,829 | 2/1968 | Hopkins . | |
| 3,589,703 | 6/1971 | Brookman | 267/162 |
| 3,598,389 | 8/1971 | Kohler | 267/161 |
| 4,400,861 | 8/1983 | Parker . | |
| 4,458,344 | 7/1984 | Coogler | 267/161 |
| 4,623,991 | 11/1986 | Vitringa | 267/161 |
| 4,625,847 | 12/1986 | Maudier | 267/161 |
| 5,149,150 | 9/1992 | Davis | 267/159 |
| 5,195,756 | 3/1993 | Wachter | 267/162 |
| 5,361,243 | 11/1994 | Kasahara | 369/44.15 |
| 5,555,222 | 9/1996 | Woo | 267/161 |
| 5,709,516 | 1/1998 | Peterson et al. | 267/162 |

FOREIGN PATENT DOCUMENTS

| 0 717 225 A1 | 6/1996 | European Pat. Off. . | |
| 0 810 354 A1 | 12/1997 | European Pat. Off. . | |
| 582185 | 8/1943 | United Kingdom | 267/162 |

*Primary Examiner*—Chris Schwartz
*Attorney, Agent, or Firm*—Foley & Lardner

[57] ABSTRACT

A circular plate spring for use in a flexible pipe unit comprises an annular base portion constructed of a spring metal plate and a plurality of equally spaced resilient support portions integral with the annular base portion. The resilient support portions are raised from the annular base portion so that each support portion is inclined relative to an imaginary plane on which the annular base portion lies.

9 Claims, 4 Drawing Sheets

CIRCULAR PLATE SPRING

BACKGROUND OF THE INVENTION

1. Field of the Invention

The present invention relates in general to springs, and more particularly to plate springs used in an exhaust pipe line of an internal combustion engine. More specifically, the present invention is concerned with circular plate springs for use in a so-called flexible pipe unit installed in the exhaust pipe line to absorb or compensate inevitable dimensional change of the pipe line during practical usage of the same.

2. Description of the Prior Art

Various flexible pipe units have been proposed and put into practical use. As is known, the flexible pipe unit is a device installed in an exhaust pipe line for absorbing or compensating an inevitable dimensional change of the pipe line during practical use of the same. For achieving this compensating function, the flexible pipe unit has a spring or springs installed therein. Some of the springs are of a circular plate type. However, due to their inherent construction, some of the springs of this circular plate type have failed to exhibit a satisfied spring function when installed in the flexible pipe unit.

SUMMARY OF THE INVENTION

It is therefor an object of the present invention to provide a circular plate spring that can exhibit a satisfied spring function when used in a flexible pipe unit.

According to the present invention, there is provided a circular plate spring for use in a flexible pipe unit. The circular plate spring comprises an annular base portion constructed of a spring metal plate, and a plurality of equally spaced resilient support portions integral with the annular base portion, the resilient support portions being raised from the annular base portion so that each support portion is inclined relative to an imaginary plane on which the annular base portion lies.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1A:
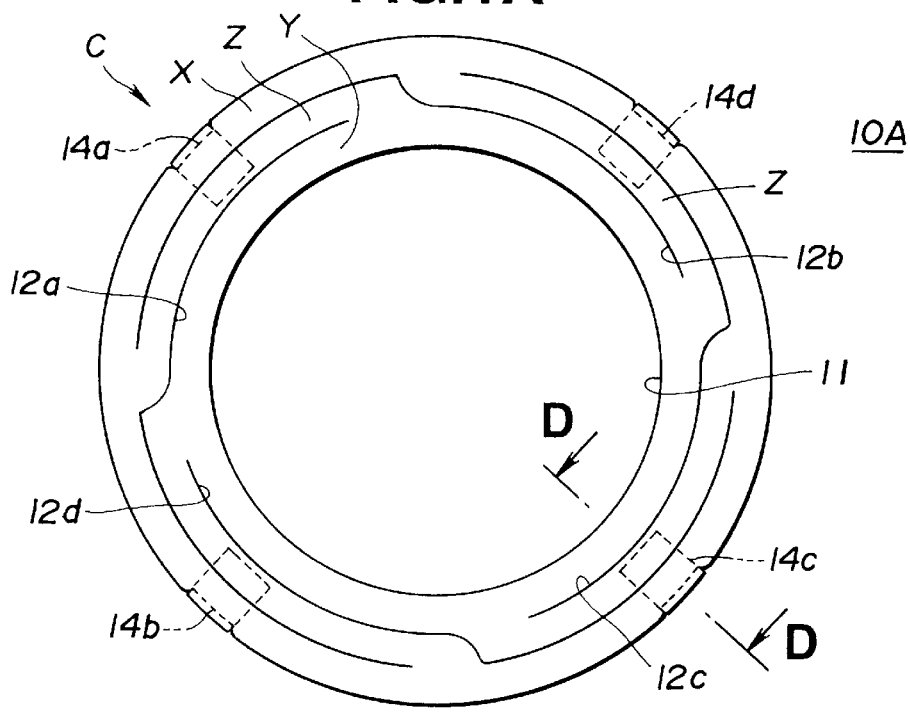
FIG. 1A is a plan view of a circular plate spring, which is a first embodiment of the present invention.

Referring to FIGS. 1A, 1B, 1C, 1D and 1E, particularly FIG. 1A, there is shown a circular plate spring 10A, which is a first embodiment of the present invention.

The circular plate spring 10A is made of a spring metal plate, such as spring steel, spring stainless steel or the like. When the metal plate is a stainless steel, the thickness of the same is about 0.8 to 2.0 mm. As is seen from FIG. 1A, the circular plate spring 10A is produced by providing a circular spring metal plate with a concentric opening 11 and four round cuts 12a, 12b, 12c, and 12d. Stamping or press machines may be used for production of the spring 10A. These four cuts 12a, 12b, 12c, and 12d are arranged in equally spaced intervals. As shown, each cut includes an outer round part and an inner round part, which are mated at a junction portion. That is, the outer round part of each cut is positioned outside of the inner round part of the neighboring cut. With these four cuts 12a, 12b, 12c, and 12d, the plate spring 10A is shaped to have a diametrically larger annular end part "X", a diametrically smaller annular end part "Y", and an intermediate annular part "Z".

Figure 1B:
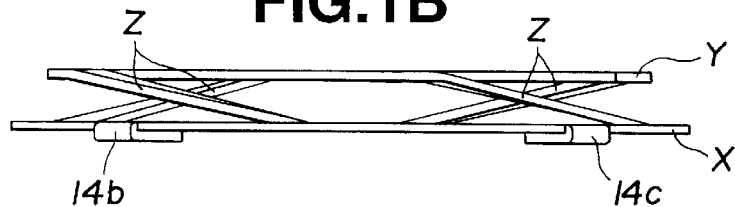
FIG. 1B is a side view of the circular plate spring of the first embodiment.

The circular plate spring 10A has four equally spaced rectangular stopper pieces 14a, 14b, 14c, and 14d possessed by and bent back onto the diametrically larger annular end part "X". As shown, each stopper piece 14a, 14b, 14c, or 14d extends to the intermediate annular part "Z". To provide the spring 10A with a spring function, the diametrically larger and smaller annular end parts "X" and "Y" are axially pulled in opposite directions to such a degree as to have a certain thickness as shown in FIG. 1B. That is, in practical use, the intermediate annular part "Z" transforms into four inclined resilient supports extending between the larger and smaller annular end parts "X" and "Y".

Figure 1C:
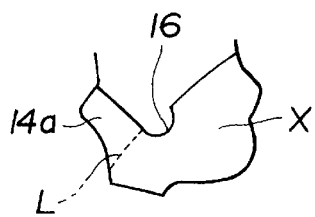
FIG. 1C is an enlarged view of a portion indicated by reference "C" in FIG. 1A.
Figure 1D:
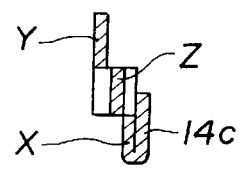
FIG. 1D is a sectional view taken along the line D—D of FIG. 1A.
Figure 1E:
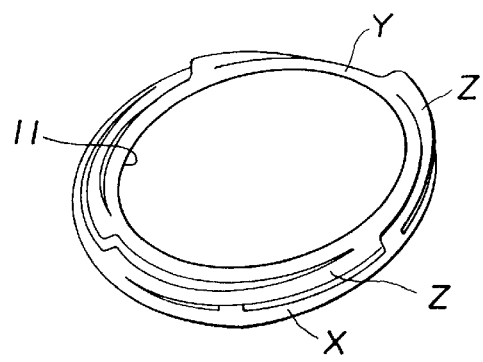
FIG. 1E is a reduced perspective view of the circular plate spring of the first embodiment.

FIG. 1C shows a method of bending back each stopper piece 14a (14b, 14c, or 14d) onto the larger annular end part "X". Designated by numeral 16 is a round recess 16 formed near the root of the stopper piece 14a. Before bending, the root of the stopper piece 14a is heated to a certain level by a heater (not shown) put in the round recess 16, and then the stopper piece 14a is bent along a bending line "L".

As will be understood from FIGS. 1A and 1B, when the plate spring 10A is compressed, the four inclined resilient supports "Z" are compressed, bringing the smaller annular end part "Y" toward the larger annular end part "X" and vice versa. Finally, the four inclined resilient supports "Z" are brought into contact with the stopper pieces 14a, 14b, 14c, and 14d. That is, the stopper pieces 14a, 14b, 14c, and 14d can serve as a stopper means for the inclined resilient supports "Z". Thus, excessive compression of the plate spring 10A is suppressed.

Figure 2:
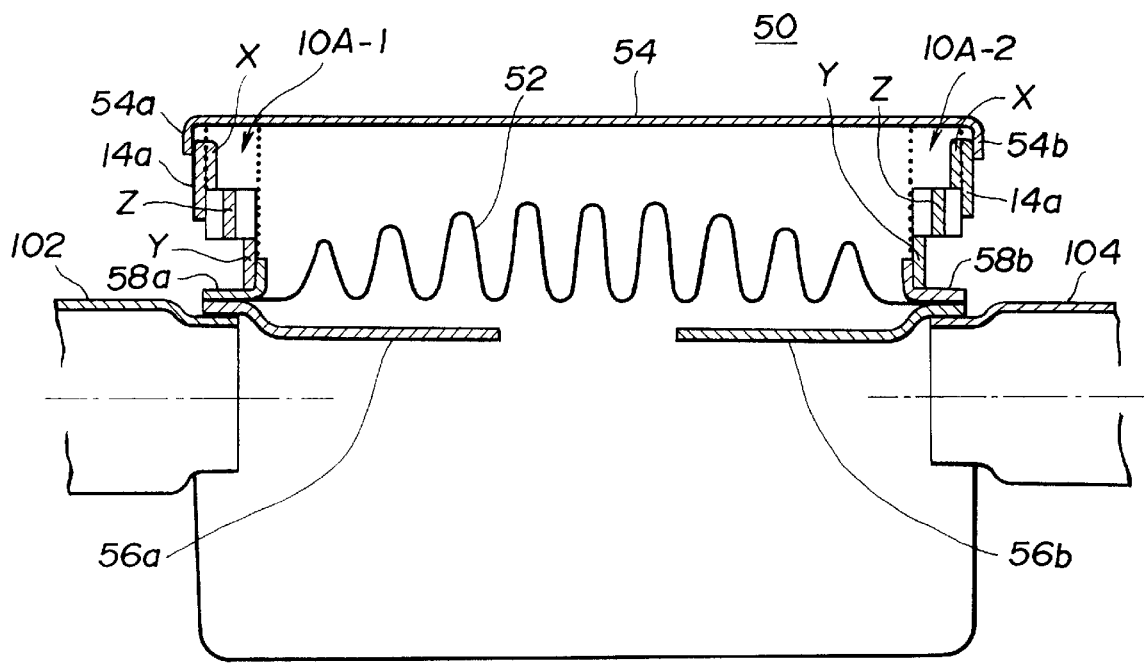
FIG. 2 is a sectional view of an upper half of a flexible pipe unit to which two circular plate springs of the first embodiment are practically applied.

Referring to FIG. 2, there is shown a flexible pipe unit 50 to which two circular plate springs 10A-1 and 10A-2 of the first embodiment are practically applied.

The unit 50 comprises a metal bellows 52 having front and rear open ends respectively connected to front and rear exhaust pipes 102 and 104. Coaxially disposed about the bellows 52 is a cylindrical outer case 54, which has front and rear open ends 54a and 54b radially inwardly bent. A front inner pipe 56a extends coaxially in the bellows 52 from the front open end of the bellows 52 toward the rear open end of the same, and a rear inner pipe 56b extends coaxially in the bellows 52 from the rear open end of the bellows 52 toward the front open end of the same. Front and rear spring holders 58a and 58b are secured or welded to the front and rear open ends of the bellows 52 respectively. Each spring holder 58a or 58b is formed with an annular flange part (no numeral) projected radially outward.

Figure 3:
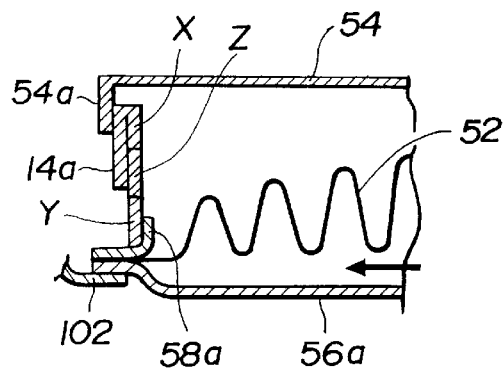
FIG. 3 is an enlarged view of a portion of FIG. 2.

As shown, one circular plate spring 10A-1 is compressed between the front bent end 54a of the outer case 54 and the raised annular flange part of the front spring holder 58a, and the other circular plate spring 10A-2 is compressed between the rear bent end 54b of the outer case 54 and the raised annular flange part of the rear spring holder 58b. More specifically, the stopper pieces 14a, 14b, 14c, and 14d of each plate spring 10A-1 or 10A-2 are welded to the front bent end 54a of the outer case 54, and the diametrically smaller end part "Y" of each plate spring 10A-1 or 10A-2 is welded to the raised annular flange part of the front or rear spring holder 58a or 58b. Thus, when, due to occurrence of a dimensional change of the exhaust pipe line, the bellows 52 is subjected to an axial compression or expansion, the annular plate springs 10A-1 and 10A-2 are axially expanded or compressed. With this, the outer case 54 can be stably held around the bellows 52 without being affected by the dimensional change of the bellows 52. That is, in this case, the plate springs 10A-1 and 10A-2 absorb the axial deformation of the bellows 52. Due to the nature of the plate spring 10A having the above-mentioned construction, the springs 10A-1 and 10A-2 can also absorb a transverse deformation of the bellows 52 effectively. When the axial expansion of the bellows 52 becomes marked, each plate spring 10A-1 or 10A-2 is compressed to such a degree that the inclined resilient supports "Z" thereof are brought into contact with the stopper pieces 14a, 14b, 14c, and 14d, as is seen from FIG. 3. With this, excessive expansion of the bellows 52 is suppressed.

Figure 4A:
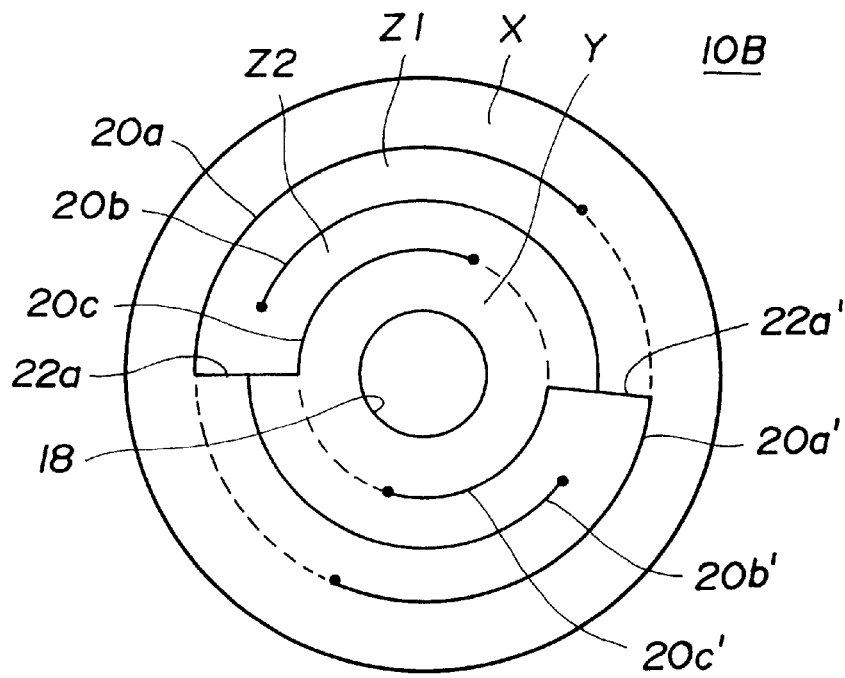
FIG. 4A is a plan view of a circular plate spring, which is a second embodiment of the present invention.
Figure 4B:
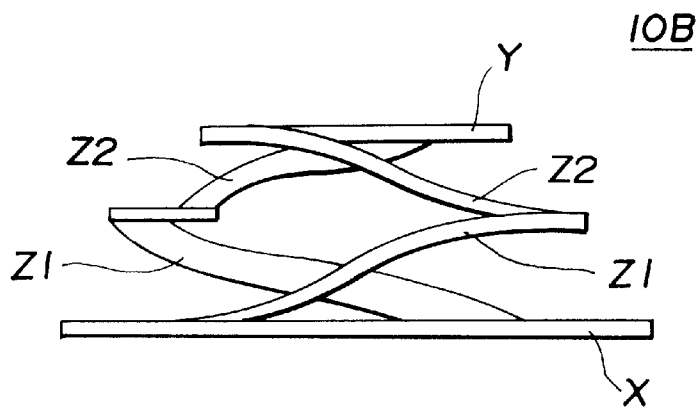
FIG. 4B is a side view of the circular plate spring of the second embodiment.

Referring to FIGS. 4A and 4B, there is shown a circular plate spring 10B, which is a second embodiment of the present invention.

The circular plate spring 10B is made of a spring metal plate, like in the case of the above-mentioned first embodiment 10A. The plate spring 10B is produced by providing a circular spring metal plate with a smaller center opening 18 and six round cuts 20a, 20a', 20b, 20b', 20c, and 20c'. As shown, the round cuts 20a and 20a' are arranged on diametrically opposed portions of a first imaginary circle concentric with the center opening 18, the round cuts 20b and 20b' are arranged on diametrically opposed portions of a second imaginary circle concentric with the center opening 18 and the round cuts 20c and 20c' are arranged on diametrically opposed portions of a third imaginary circle concentric with the center opening 18. Leading ends of the round cuts 20a and 20c are connected through a radial cut 22a to which a trailing end of the round cut 20b' is connected. Leading ends of the round cuts 20a' and 20c' are connected through another radial cuts 22a' to which a trailing end of the round cut 20b is connected. With these cuts 20a, 20a', 20b, 20b', 20c, 20c', 22a, and 22a', the plate spring 10B is shaped to have a diametrically larger annular end part "X", a diametrically smaller annular end part "Y", an outer intermediate annular part "Z1", and an inner intermediate annular part "Z2". To provide the spring 10B with a spring function, the larger and smaller annular end parts "X" and "Y" are axially pulled in opposite directions to such a degree as to have a certain thickness as shown in FIG. 4B. That is, in practical use, the outer and inner intermediate annular parts "Z1" and "Z2" transform into a pair of stepped resilient supports extending between the larger and smaller annular end parts "X" and "Y", each support including a first inclined resilient support part "Z1" and a second inclined resilient support part "Z2", as is understood from FIG. 4B. As shown in FIG. 4B, the first and second inclined resilient support parts are integrally connected at ends thereof and extend in different directions.

Of course, the plate spring 10B of this second embodiment can be practically applied to the flexible pipe unit 50 in place of the springs 10A-1 and 10A-2.

Figure 5A:
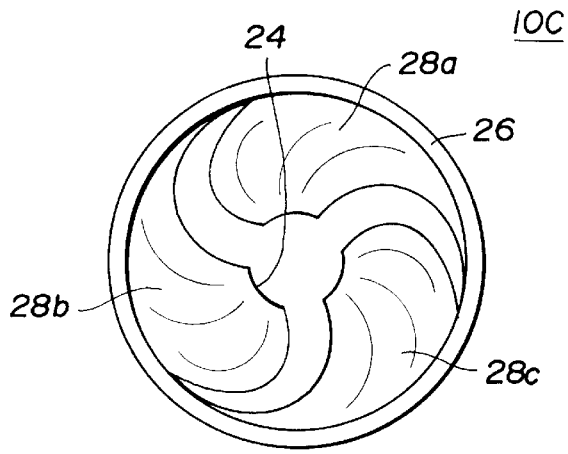
FIG. 5A is a plan view of a circular plate spring, which is a third embodiment of the present invention.
Figure 5B:
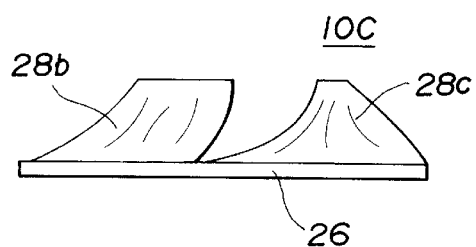
FIG. 5B is a side view of the circular plate spring of the third embodiment.

Referring to FIGS. 5A and 5B, there is shown a circular plate spring 10C, which is a third embodiment of the present invention.

The circular plate spring 10C is made of a spring metal plate, like in the case of the above-mentioned first embodiment 10A. The plate spring 10C is produced by providing a circular spring metal plate with an opening 24 having three tail-shaped portions. With the opening 24, the metal plate is shaped to comprise a diametrically larger annular base part 26 and equally spaced three blade parts 28a, 28b and 28c each extending radially inward from the annular base part 26. As is understood from FIG. 5B, to provide the spring 10C with a spring function, the three blade parts 28a, 28b, and 28c are somewhat raised from the annular base part 26 so that they have mutually converging upper ends. In practical use, the annular base part 26 serves as the diametrically larger annular end part of the spring 10A of the first embodiment, and the mutually converging upper ends of the blades 28a, 28b, and 28c serve as the diametrically smaller annular end part of the spring 10A.

Figure 6A:
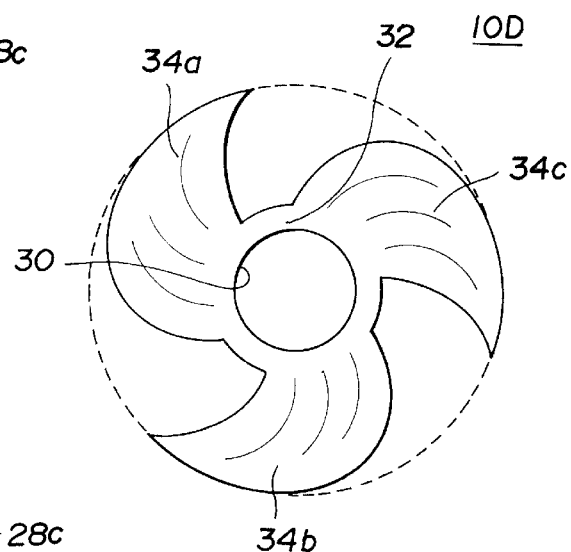
FIG. 6A is a plan view of a circular plate spring, which is a fourth embodiment of the present invention.
Figure 6B:
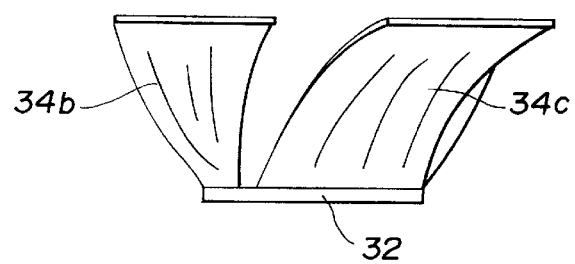
FIG. 6B is a side view of the circular plate spring of the fourth embodiment.

Referring to FIGS. 6A and 6B, there is shown a circular plate spring 10D, which is a fourth embodiment of the present invention.

The circular plate spring 10C is made of a spring metal plate, like in the case of the above-mentioned first embodiment 10A. The plate spring 10D is produced by providing a circular spring metal plate with a smaller center opening 30 and three cuts. With these openings 30 and cuts, the metal plate is shaped to comprise a diametrically smaller annular base part 32 and equally spaced three blade parts 34a, 34b and 34c each extending radially outward from the annular base part 32. As is understood from FIG. 6B, to provide the spring 10D with a spring function, the three blade parts 34a, 34b and 34c are somewhat raised from the annular base part 32 so that they have mutually receding, i.e., diverging upper ends. In practical use, the annular base part 32 serves as the diametrically smaller end part of the spring 10A of the first embodiment, and the mutually receding upper ends of the blades 34a, 34b and 34c serve as the diametrically larger annular end part of the spring 10A.

What is claimed is:

1. A circular plate spring for use in a flexible pipe unit, comprising:

an annular base portion constructed of a spring metal plate;

a plurality of equally spaced resilient support portions integral with said annular base portion, said resilient support portions being raised from said annular base portion so that each of said resilient support portions is inclined relative to an imaginary plane on which said annular base portion lies;

an annual end portion integrally connected to an upper end of each of said resilient support portions, said annular end portion being concentric with said annular base portion and having a smaller diameter than said annular base portion; and stopper pieces integrally formed with said annular base portion, against which said resilient support portions abut when said resilient support portions are compressed by a predetermined degree.

2. A circular plate spring as claimed in claim 1, in which said stopper pieces are bent back onto said annular base portion and extend radially inward to a position to face said resilient support portions.

3. A circular plate spring as claimed in claim 1, in which each of said resilient support portions comprises a first inclined resilient support part and a second inclined resilient support part integrally connected at ends thereof and extend in different directions.

4. A circular plate spring as claimed in claim 1, in which said resilient support portions are three in number.

5. A circular plate as claimed in claim 1, in which said plate spring is constructed of a stainless steel plate having a thickness of about 0.8 to 2.0 mm.

6. A circular plate spring for use in a flexible pipe unit, comprising:

an annular base portion constructed of a spring metal plate; and a plurality of equally spaced resilient support portions integral with said annular base portion, said resilient support portions being raised from said annular base portion so that each of said support portions is inclined relative to an imaginary plane on which said annular base portion lies, wherein said resilient support portions are three in number, and wherein said resilient support portions extend radially inward from said annular base portion so that said resilient support portions have mutually converging upper ends.

7. A circular plate spring for use in a flexible pipe unit, comprising:

an annular base portion constructed of a spring metal plate; and a plurality of equally spaced resilient support portions integral with said annular base portion, said resilient support portions being raised from said annular base portion so that each of said support portions is inclined from said annular base portion so that each of said support portions is inclined relative to an imaginary plane on which said annular base portion lies, wherein said resilient support portions are three in number, and wherein said resilient support portions extend radially outward from said annular base portion so that said resilient support portions have mutually diverging upper ends that terminate.

8. A circular plate spring as claimed in claim 7, wherein each of said diverging upper ends terminates as a free end.

9. A circular plate spring for use in a flexible pipe unit, comprising:

an annular base portion formed from a stamped or pressed circular spring metal plate;

a plurality of equally spaced resilient support portions integral with the annular base portion, the resilient support portions being obliquely raised from the annular base portion so that each of the support portions is inclined relative to an imaginary plane on which the annular base portion lies; and an annular end portion integrally connected to an upper end of each of the resilient support portions, the annular end portion being concentric with the annular base portion, wherein the circular spring plate assumes a flat condition when the resilient support portions and the annular end portion are flush with the annular base portion, each of the resilient portions contacting the annular base portion and the annular end portion throughout a peripheral edge thereof.

* * * * *